United States Patent
Saint-Hilaire et al.

(10) Patent No.: US 7,212,505 B2
(45) Date of Patent: May 1, 2007

(54) ROAMING IN A COMMUNICATION NETWORK

(75) Inventors: Ylian Saint-Hilaire, Hillsboro, OR (US); James L. Jason Jr., Hillsboro, OR (US); Frederick William Strahm, Hillsboro, OR (US); Erik J. Johnson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 665 days.

(21) Appl. No.: 09/813,099

(22) Filed: Mar. 19, 2001

(65) Prior Publication Data
US 2002/0132620 A1 Sep. 19, 2002

(51) Int. Cl.
*H04Q 7/00* (2006.01)
*H04Q 7/216* (2006.01)
*H04Q 7/20* (2006.01)
H04Q 7/24

(52) U.S. Cl. .............. 370/328; 370/335; 370/342; 455/432.1

(58) Field of Classification Search ............. 370/328, 370/335, 342, 352–356, 400, 395.52, 422, 370/313, 338; 455/432.1, 433, 432; 709/227–229
See application file for complete search history.

(56) References Cited

U.S. PATENT DOCUMENTS 5,708,655 A * 1/1998 Toth et al. ............... 370/313
6,144,671 A * 11/2000 Perinpanathan et al. .... 370/409
6,195,705 B1 * 2/2001 Leung ..................... 709/245
6,240,078 B1 * 5/2001 Kuhnel et al. ............ 370/331
6,407,988 B1 * 6/2002 Agraharam et al. ....... 370/328
6,496,505 B2 * 12/2002 La Porta et al. .......... 370/392
6,501,767 B1 * 12/2002 Inoue et al. .............. 370/465
6,510,153 B1 * 1/2003 Inoue et al. .............. 370/354
6,535,493 B1 * 3/2003 Lee et al. ................. 370/329
6,578,085 B1 * 6/2003 Khalil et al. ............. 709/241
6,587,882 B1 * 7/2003 Inoue et al. .............. 709/227
6,621,810 B1 * 9/2003 Leung ..................... 370/338

OTHER PUBLICATIONS

RFC 2002, IP Mobility Support, IETF Oct. 1996.*
RFC 2344, Reverse Tunneling for Mobile IP, IETF May 1998.*
RFC 2003, IP Encapsulation within IP, IETF Oct. 1996.*
Perkins, Charles E., Luo, Kevin, "Using DHCP with Computers that Move", Baltzer Journals.*

* cited by examiner

Primary Examiner—Chi Pham
Assistant Examiner—Melanie Jagannathan
(74) Attorney, Agent, or Firm—Fish & Richardson P.C.

(57) ABSTRACT

Communicating over a network includes establishing a communication path between a mobile-device in a first communication area and a server through a home-agent, and maintaining the communication path through the home agent when the mobile-device moves to a second-communication-area.

28 Claims, 5 Drawing Sheets

ROAMING IN A COMMUNICATION NETWORK

BACKGROUND

This invention relates to roaming in a communications network.

Personal computers (PCs) can connect to networks including the Internet using various protocols including transmission control protocol/Internet Protocol (TCP/IP). When these PCs communicate over the Internet they are identified by an Internet Protocol (IF) address. Typically, the IP address does not change because the physical location of the PC is fixed. Mobile and portable wireless handheld devices such as a personal digital assistant (PDA) can connect to the Internet using wireless technology. However, these devices may experience interruptions in communications as they move, because the IP address associated with one location may be different from the IF address associated with another location.

DETAILED DESCRIPTION

Figure 1:
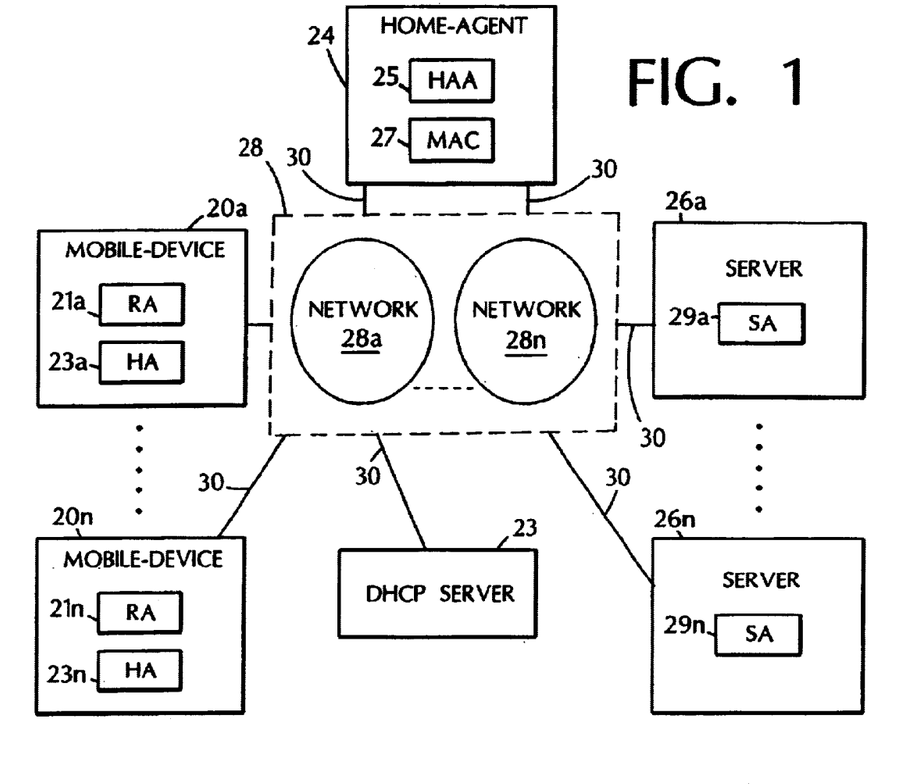
FIG. 1 illustrates a computer network system.

As shown in FIG 1, mobile-devices 20a, 20n exchange data with servers 26a, 26n using a computer network 28, which may any one of sub-networks 28a, 28n through a home-agent 24, which can interface with any of the sub-networks 28a, 28n. The computer network 28a, 28n can be, but is not limited to, the Internet, a local area network (LAN), or a wireless local area network (WLAN). The communications link 30, which can be implemented using wired or wireless technologies, is the connection point through which data flows over the network 28a, 28n. A mobile-device 20a, 20n includes a processor capable of connecting to the network 28a, 28n using wireless techniques. Each mobile-device 20a, 20n is assigned a real-address (RA) 21a, 21n by a dynamic host configuration protocol (DHCP) server 23 and a home-address (HA) 23a, 23n by the home-agent 24. The home-agent 24 is assigned a home-agent address (HAA) 25 and a media access control (MAC) address 27 that is based on a unique hardware number associated with the home-agent 24. The home-agent 24 is a network-compatible device that determines the network point to which data should be forwarded towards its destination.

The address relationship between the mobile-devices 20a, 20n and the home-agent 24 is based on a subnet-addressing scheme. The subnet may be a separate part of an organization's network and may represent all of the mobile-devices 20a, 20n at one geographic location, for example in a building or on a LAN. Dividing an organization's network 28a, 28n into subnets allows the mobile-devices 20a, 20n to be connected to the network with a single shared network address. By assigning each mobile-device 20a, 20n an address HA 21a, 21n based on the address HAA 25 of the home-agent 24, the home-agent 24 is able to acquire and maintain a single connection to the network for each of the mobile-devices 20a, 20n within the subnet.

Each server 26a, 26n is identified by a server-address (SA) 29a, 29n. The servers 26a, 26n communicate with the mobile-devices 20a, 20n over the network 28a, 28n through the communications link 30 using coaxial, optical, or wireless, or a combination of such techniques. Typically, a mobile-device 20a, 20n requests the services, such as data and information, provided by a server 26a, 26n through the use of the home-agent 24. As a mobile-device 20a, 20n moves from one location associated with an RA to another location associated with a different RA, uninterrupted communication is maintained between the mobile-device and the server.

Figure 2:
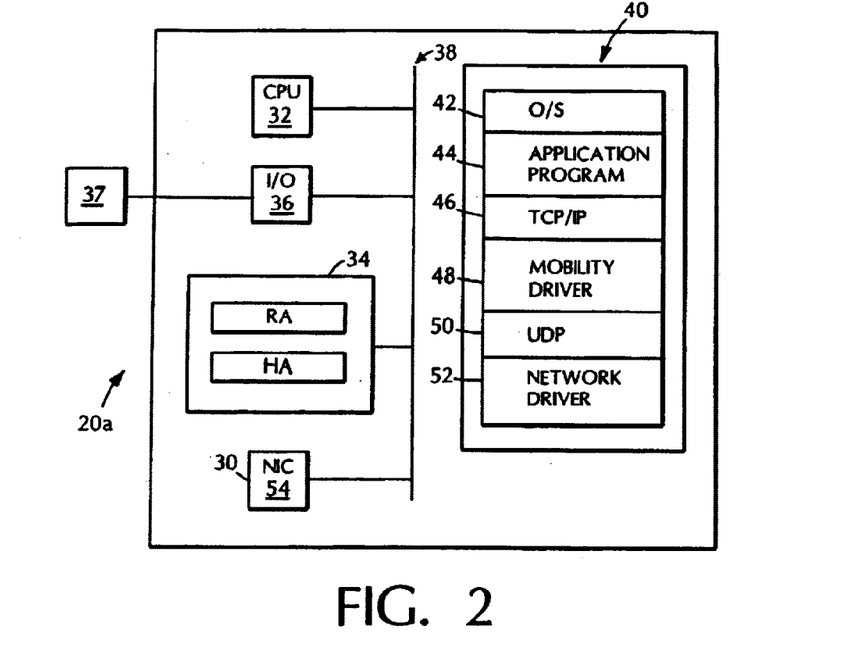
FIG. 2 is a block diagram of a mobile-device.

As shown in FIG. 2, a mobile-device such as the device 20a can include a central processing unit (CPU) 32, such as an Intel Pentium-brand processor, connected to a computer-bus 38, such as a peripheral connect interface (PCI). The CPU 32 processes data and executes instructions residing in memory 34 such as a dynamic random access memory (DRAM). RA and HA addresses may be stored in memory 34. The mobile-device 20a also may contain an input/output (I/O) interface 36 coupled to the computer-bus 38. The I/O interface 36 allows peripheral devices 37 to be coupled to the mobile-device 20a. Peripherals 37 may include, for example, an input keyboard terminal, an output graphical display, and a mass storage device, such as a hard disk or a tape drive. A network interface card (NIC) 54 provides the mobile-device 20a with access to the communications link 30. The technology supported by the NIC 54 can include, but is not limited to, wireless technologies such as those specified in IEEE 802.11, coaxial, or fiber.

The mobile-device 20a is driven and controlled by various levels of programs contained in software module 40. An operating system (OS) 42 is responsible for managing the overall functionality of the mobile-device 20a. Exemplary OSs include UnixWare, Windows NT, and Palm OS. Application programs 44, such as Web browsers or electronic-mail (Email) programs, are responsible for providing the user with a high-level interface to the mobile-device and the network. The application programs 44 are also responsible for providing the functions performed by the mobile-device 20a. A network protocol layer 46 is responsible for handling the reception and transmission of data packets over the network. Such a protocol may include a TCP/IP stack or other protocol based on the network open systems interconnections (OSI) communication model. The TCP/IP stack is responsible for managing the disassembly and addressing of data packets forwarded by the application programs 44 and the assembly of data packets received from a mobility-driver 48. Other protocol layers 46 may include AppleTalk which implements a datagram delivery protocol corresponding closely to the network layer of the OSI communication model. The protocol layers 46 in the mobile-device 20a and the home-agent 24 should be similar for proper operation. The mobility-driver 48, which resides below the TCP/IP stack 46, is responsible for enabling the mobile-device 20a to move seamlessly between different locations. A user datagram protocol (UDP) layer 50 provides an additional standard communications protocol that is used in conjunction with the mobility-driver 48 to further process data to be exchanged over the network 28a, 28n. The network-driver 52 includes a program that controls the hardware-based NIC 54 enabling the mobile-device 20a to interface to the network 28a, 28n by facilitating the exchange of data over the communication link 30.

Figure 3:
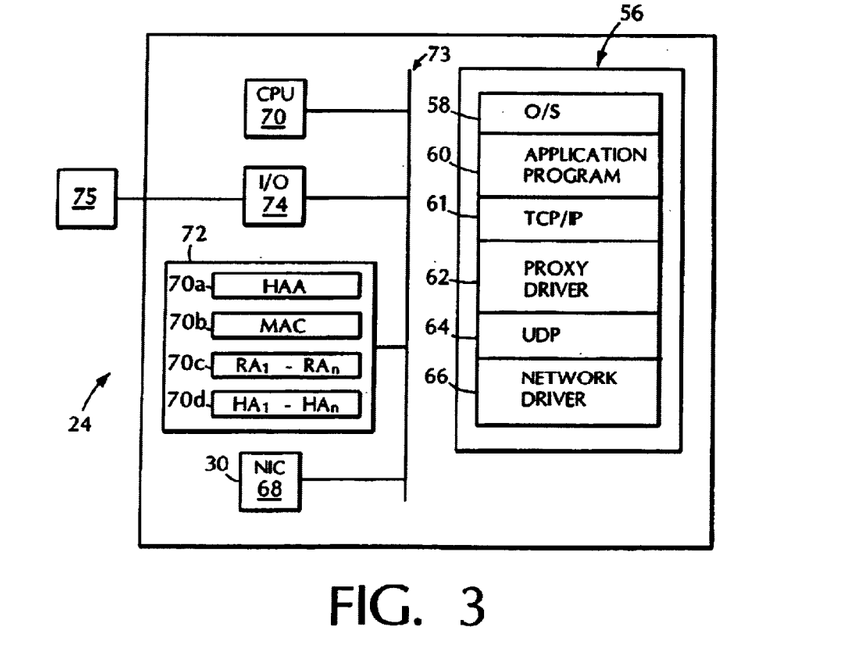
FIG. 3 is a block diagram of a home-agent.

As shown in FIG. 3, a home-agent 24 includes some hardware and software components that are similar to those in the mobile-device 20a. For example, the home agent 24 includes a CPU 70 which processes data and executes instructions residing in memory 72. The CPU 70 and the memory 72 are both coupled to the device bus 73. The HAA and MAC addresses associated with the home-agent 24 are stored in the memory 72. The home-agent 24 maintains and keep tracks of the RA 70c and the HA 70d of each mobile-device 20a, 20n authorized to communicate with the home-agent. The NIC 68 provides the home-agent 24 with access to the communications link 30. The home-agent 24 also may contain an I/O interface 74 coupled to the device bus 73 which allows peripherals 75 to be connected to the home-agent. Peripherals 75 may include, for example, an input keyboard terminal, an output video display, and a mass storage device such as a hard disk or a tape drive.

The home-agent 24 is driven and controlled by various levels of programs contained in software module 56. The software module 56 includes an OS 58 responsible for managing the home-agent 24, application programs 60 responsible for providing the functions performed by the home-agent 24 such as managing the mobile-devices 20, 20n, and network protocol layer 61 such as a TCP/IP program stack for managing data packets. A proxy-driver 62 resides at a logically lower level than the TCP/IP layer 61 and is responsible for maintaining uninterrupted communication between the mobile-devices 20a, 20n and a particular server 26a, 26n. The proxy-driver 62 manages the data-requests, in the form of data-packets, generated by a mobile-device 20a, 20n and directed to a server 26a, 26n. It also manages the corresponding data-response from the server 26a, 26n in the form of data-packets. A network-driver 66 is responsible for controlling the NIC 68 and enabling the exchange of data-packets over the network 28a, 28n.

Figure 4:
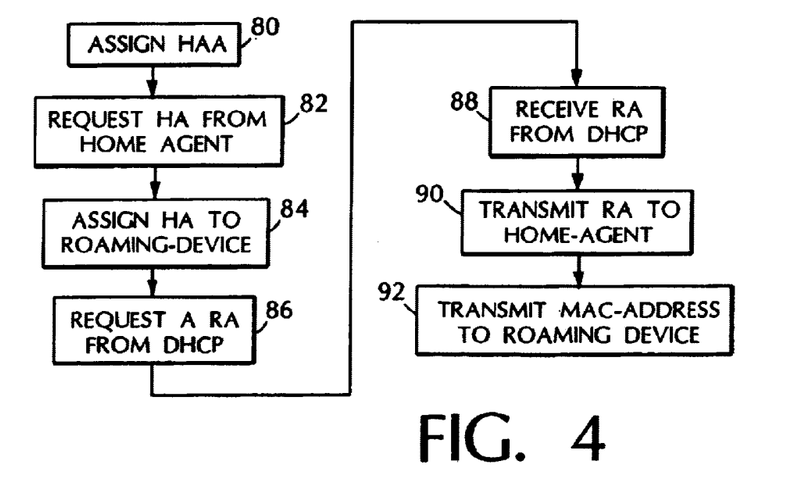
FIG. 4 is a flow chart of a method of initializing a home-agent and mobile-devices.
Figure 5A:
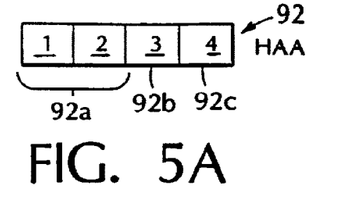
FIGS. 5A–5D illustrate address parameters.
Figure 5B:
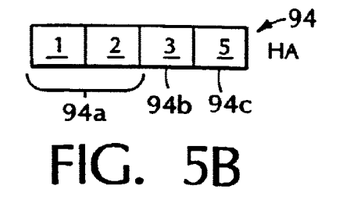

As shown in FIG. 4, to initialize the home-agent 24, it is assigned 80 a HAA according to a particular subnet addressing scheme. As shown in FIG. 5A, the HAA 92 includes a network-address-portion 92a which is set to 1.2, a subnet-portion 92b which is set to 3, and a host-address-portion 92c which is set to 4. The HAA 92 is an (IP) address and is represented, using dotted quad notation, as 1.2.3.4. In order for a mobile-device 20a, 20n to communicate with a server 26a, 26n over the network 28a, 28n, it contacts the home-agent 24 and requests 82 a HA. The home-agent 24 uses this addressing scheme to manage mobile-devices 20a, 20n that have a HA 94 (see FIG. 5B) including a network-portion 94a set to 1.2, a subnet-portion 94b set to 3, and a host-address-portion 94c set to at least 4. The home-agent 24 assigns, for example, a unique HA such as 1.2.3.5 to the mobile-device 20a. The subnet administrator is responsible for managing the allocation of these addresses. The assigned HA 94 is communicated 84 from the home-agent 24 to the mobile-device 20a and stored for later use.

Figure 5C:
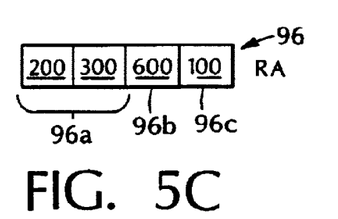
Figure 5D:
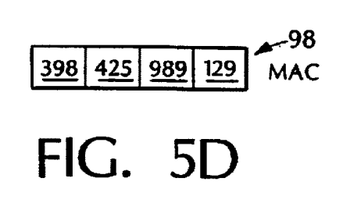

Next the mobile-device 20a requests 86 a RA from the DHCP server 23 (see FIG. 1). The DHCP protocol allows network and subnet administrators to manage centrally and to automate the assignment of IP addresses in an organization's network. The DHCP server 23 assigns a RA dynamically and avoids the necessity of the user entering a new RA every time the RA changes when the mobile-device 20a moves to a new location. The DHCP server 23 responds with a RA 96 (see FIG. 5C) including a network-portion 96a set to 200.300, a subnet-portion 96b set to 600, and a host-address-portion 96c set to 100. Once the mobile-device 20a, 20n receives 88 the unique RA from the DHCP server 23, it stores it in memory for later retrieval whenever it needs to communicate over the network 28a, 28n. The mobile-device 20a then communicates 90 the RA 96 to the home-agent using a standard roaming protocol "registration message" such as defined in RFC 3220, for example, over the network 28a, 28n. The home-agent 24 then transmits 92 to the mobile-device 20a the MAC address 98 associated with the home-agent NIC 68. FIG. 5D shows a typical MAC address 98 associated with the home-agent 24 hardware. Once the mobile-device 20a has registered with the home-agent 24, it is now capable of communicating with a server 26a, 26n over the network 28a, 28n through the home-agent.

Figure 6:
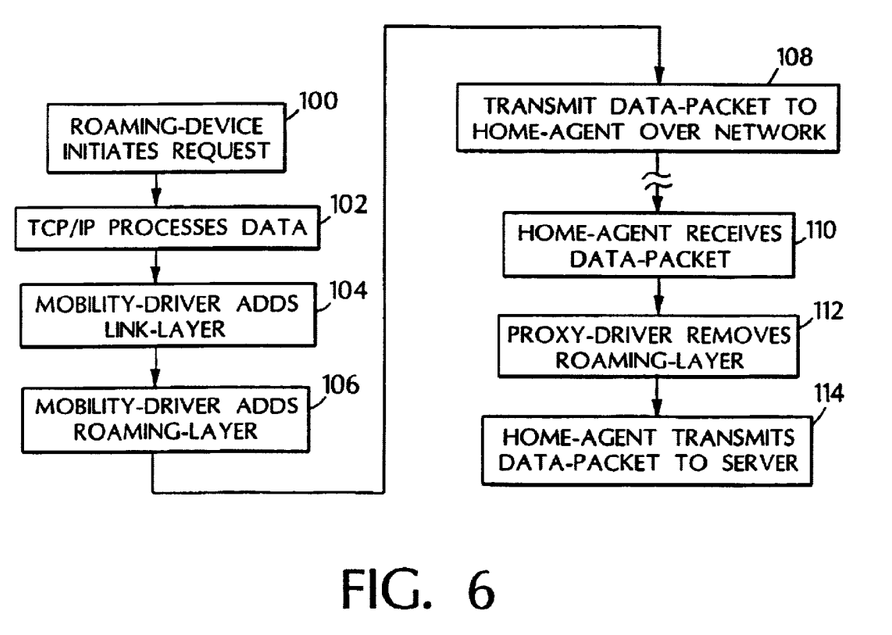
FIG. 6 is a flow chart of a method of processing requests from a mobile-device.
Figure 7A:
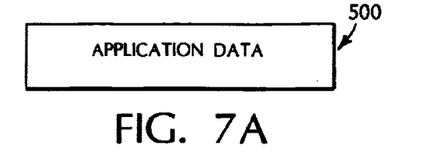
FIGS. 7A–7E represent a sequence of data units comprising a data packet transmitted from a mobile-device.

As shown in FIG. 6, a person using a mobile-device 20a, and desiring to communicate over a network 28a, 28n, such as the World Wide Web (WWW), can use an application program, such as a Web browser, to initiate 100 a request directed to a Web site. As an example, a person using the mobile-device 20a and desiring to receive news information from a particular Web site would provide the address of the home page of the Web site. The Web browser application program provides the user with an interface to the Web. At the highest level of abstraction, a data-request includes a series of data-units that are combined into data-packets and communicated over the network 28a, 28n, processed by the home agent 24, and retransmitted to the server 26a. As shown in FIG. 7A, application-data-segment 500 is the first data-unit that is generated by the mobile-device 20a and it includes the data and information for the specific request.

Figure 7B:
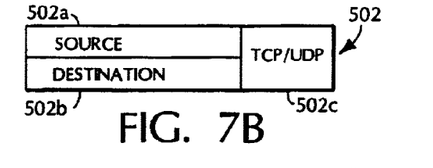

Once the application-data-segment 500 has been generated, it is forwarded to the TCP/IP stack 46 of the mobile-device 20a which further processes 102 the data packet. The TCP/IP stack is a two-layer program in which the TCP portion is responsible for disassembling and assembling a data packet and the IP portion handles the address part of the packet so that it arrives at the correct destination. Alternatively, a UDP program layer can be used instead of TCP, and, together with IP, can generate a data-unit called a datagram. As shown in FIG. 7B, a TCP/IP-header 502 includes a TCP/UDP sub-header 502c and IP sub-headers 502a, 502b are concatenated to application-data-segment 500. In a TCP embodiment, the header 502c provides information associated with the packets that have been disassembled for transmission in order for the destination end to be able to reassemble the received packets. On the other hand, in a UDP embodiment, sequencing of the packets is not provided. Therefore, the application program at the receiving destination is responsible for assuring that the data packets arrive in the correct order. UDP can be used when ordering is not an issue or when the data units exchanged are small allowing network applications to save processing time. The IP program is responsible for setting the source-address field 502a to the HA of the mobile-device 20a and setting the destination-address-field 502b to the server-address SA of the server 26a requested by the mobile-device 20a.

Figure 7C:
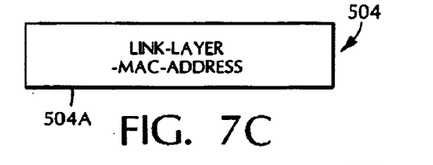
Figure 7D:
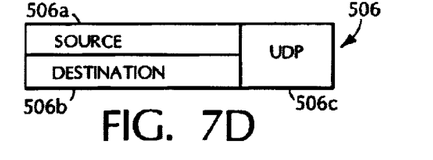

After the TCP/IP-header 502 has been formed, the mobility-driver 48 handles the concatenation 104 of the link-layer-header 504 to the current data packet including application-data-segment 500 and header 502. As shown in FIG. 7C, the link-layer-header 504 includes the MAC address field 504*a* which is set to the address corresponding to the unique hardware number of the home-agent 24. The MAC address is used by the MAC sublayer of the data-link layer (DLC) of the OSI model. The mobility-driver 48 then encapsulates 106 the data packet including headers 500, 502, 504 with an additional roaming-header 506 that includes an IP and a UDP portion. As shown in FIG. 7D, the UDP portion 506*c* is set to the address of the proxy-driver 62 program residing in the home-agent 24. The IP portion includes the source-address-field 506*a*, which is set to the RA of the mobile-device 20*a*, and the destination-address-field 506*b*, which is set to the HAA of the home-agent 24.

Once the data-packet has been formed with the application-data-segment 500 and various headers 502–506, it is ready to be transmitted to the home-agent 24 over the network 28*a*, 28*n*. The data-packet is handed to the network-driver 52 in the mobile-device 20*a* corresponding to the physical layer of the OSI model. The network-driver 52 ensures that the data-packet is transmitted 108 over the network 28*a*, 28*n*.

Figure 7E:
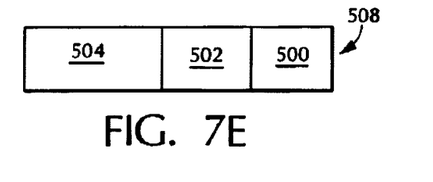

After the data-packet is transmitted over the network 28*a*, 28*n*, it is received 110 by the home-agent 24 and handled by the NIC 68 in conjunction with the network driver 66. The data-packet is then forwarded to the proxy-driver 62, which is responsible for processing 112 the data-packet headers. As shown in FIG. 7E, the proxy-driver 62 removes the roaming-header 506 so that the data packet 508 includes the application-data-segment 500 and the original headers 502, and 504. The data-packet then is retransmitted 114 over the network 28*a*, 28*n* and directed to the server 26*a* associated with the destination address embedded in the destination-field 502*b* of the data-packet.

Figure 8:
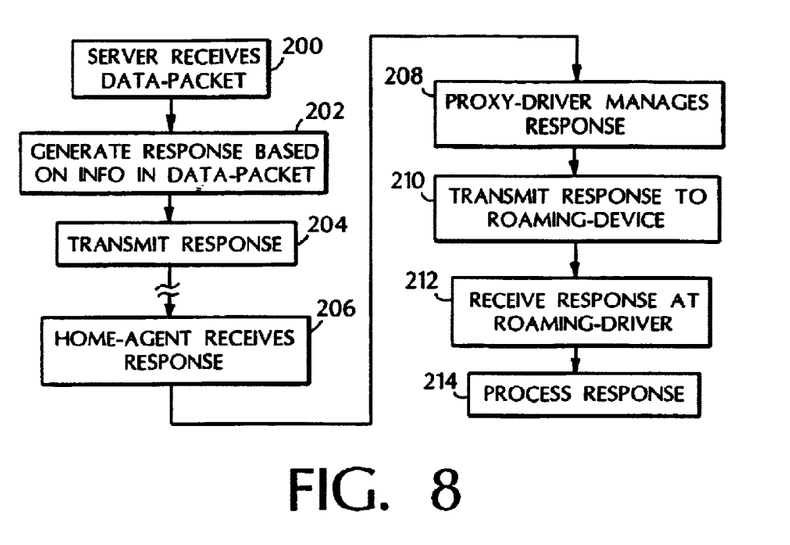
FIG. 8 is a flow chart of a method of generating a data-packet from a server.
Figure 9A:
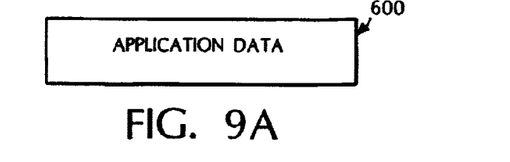
FIGS. 9A–9D represent a sequence of data units.
Figure 9B:
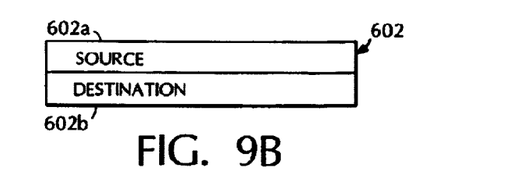

As shown in FIG. 8, the server 26*a* corresponding to the destination field 502*b* receives 200 the data-packet from the home-agent 24. The server 26*a* handles the data-packet using a network adapter and a corresponding network device driver. Application programs running on the server process 202 the request based on the information in the data packet. As shown in FIG. 9A, based on the earlier request from the mobile-device 20*a*, the server application responds with an application-data-segment header 600 containing news-related information in a format compatible with standard network communications protocols based on the OSI model. The server not only responds with the actual data, but it also adds information related to the source and destination of the data packet. As shown in FIG. 9B, the layers in the server 26*a* generate a response-header 602 containing a source-address-field 602*a* set to the IP address of the server and a destination-address-field 602*b* set to the HAA of the home-agent 24. Once the data packet has been constructed with the communication headers, the server 26*a* transmits 204 the data-packet over the network 28*a*, 28*n* using, for example, standard network communications techniques.

Figure 9C:
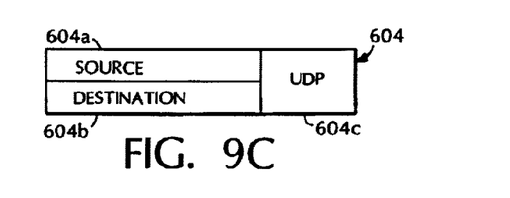

Once the data-packet arrives 206 at the home-agent 24, the NIC 68 and the associated network driver 66 handle the data-packet. The data-packet is handed 208 to the proxy-driver 62 which is responsible for processing and forwarding the data-packet to the appropriate mobile-device 20*a*, 20*n*. As shown in FIG. 9C, the proxy-driver 62 adds a roaming-header 604 with IP and UDP sub-headers 604*a*, 604*b*, 604*c* to the received data-packet headers 600 and 602. The data-packet subsequently is forwarded to the mobile-device 20*a* associated with the RA embedded in the data-packet. The proxy-driver 62 sets the destination-address field 604*b* to the RA of the mobile-device 20*a* and sets the source-address field to the HAA of the home-agent 24. Once the proxy-driver 62 processes the data packet, it is passed back down to the network-driver 66 which is responsible for transmitting 210 the data-packet over the network 28*a*, 28*n*.

Figure 9D:
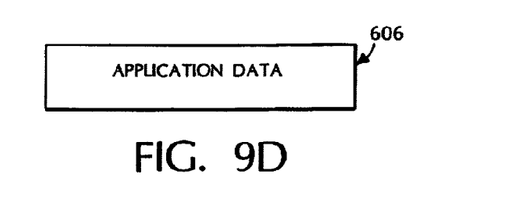

The mobile-device 20*a* associated with the RA in the data-packet receives 212 the data-packet representing the response to the original server request for news related services. The various protocol layers 46 and the mobility-driver 48 of the mobile-device 20*a* process 214 the data packet according to their respective responsibilities so that the user request is satisfied. For example, the user may expect that the news information requested from the news service Web site will be received and processed by the Web browser running on the mobile-device 20*a* without an interruption in communication. As shown in FIG. 9D, the application-data-segment 606, which is the data transmitted 600 from the server 26*a* in response to the mobile-device 26*a*, is available for processing by the application program 44 and the Web browser.

Figure 10:
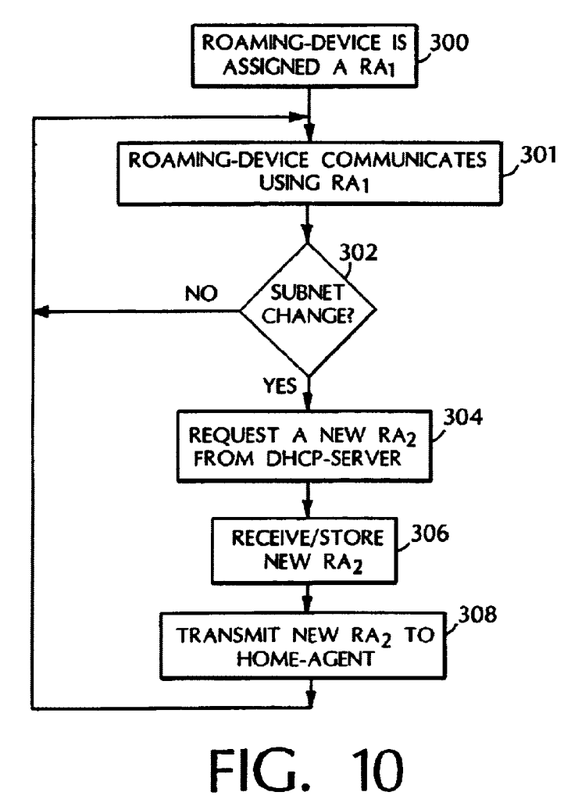
FIG. 10 is a flow chart of a method of processing a change in a subnet by a mobile-device.
Figure 11A:
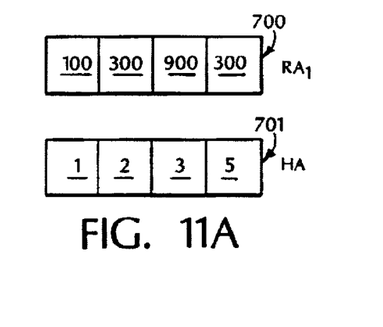
FIGS. 11A–11C represent address parameters during a change in a subnet.
Figure 11B:
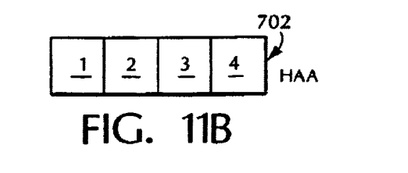

FIG. 10 illustrates a specific example of how uninterrupted communication between a mobile-device 20*a* and the server 26*a* is maintained when the mobile-device 20*a* moves to a location associated with a different subnet. The mobile-device 20 initially is assigned 300 a set of addresses when it registers with the home-agent 24. For example, as shown in FIG. 11A, the mobile-device 20*a* is assigned an initial-real-address RA1 700 and a home-address of HA 701. As shown in FIG. 11B, the home-agent 24 is assigned a home-address of HAA 702. The home-agent 24 keeps track of the mobile-device 20*a* by storing RA1 in its memory 72. The mobility-driver 48 of the mobile-device 20*a* uses these initial addresses to communicate 301 with the home-agent 24 over the network 28*a*, 28*n*.

The mobility-driver 48 is able to detect a change 302 in the real address corresponding to a different subnet. In a particular embodiment, the mobile-device is in communication with cell towers that emit signals of different magnitudes. As the mobile-device moves from a first location covered by a first cell tower to a second location covered by a second cell tower, the signal it receives from the first location will decrease in strength while the signal from the second location will increase in strength. Once the strength of the signal from the second location reaches a threshold, the mobile device detects the change in location.

Figure 11C:
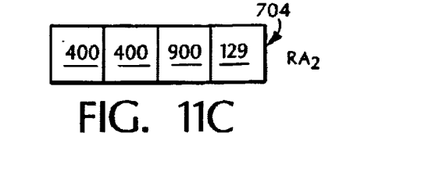

Once a change is detected, the mobile-device 20*a* requests 304 a new real-address from the DHCP server 23. As shown in FIG. 11C, the DHCP server 23 assigns a new real-address (RA2) 704 to the mobile-device 20*a*. Upon receipt of RA2, the mobile-device 20*a* communicates 306 the change in the real-address associated with the new subnet to the home-agent 24. The mobile-device 20*a* continues to communicate 301 with the home-agent 24 without a significant gap in communication as a result of the change in the subnet address.

The foregoing techniques can enable a mobile-device to maintain substantially uninterrupted communication while moving to another location associated with a new subnet address. Furthermore, since the technique can be implemented in a software layer that resides below the more complicated TCP/IP stack 46, there is no need to modify the TCP/IP stack, thus leading to a simpler and more cost-effective solution.

Various modifications may be made. For example, a mobile-device can communicate with another mobile-device within the same subnet by using a protocol such as inter-network packet exchange/sequenced packet exchange (IPX/SPX). Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the following claims.

What is claimed is:

1. A method comprising:
   generating a request from a mobile-device, the request comprising a request-layer including a home-address of the mobile-device and a server-address;
   encapsulating the request-layer with a roaming-layer including a real-address of the mobile-device and a home-agent-address;
   communicating the encapsulated request-layer to a home-agent based on the home-agent-address;
   using a program layer below a transmission control protocol/internet protocol (TCP/IP) program layer in the mobile-device to generate the request, encapsulate the request-layer and communicate the encapsulated request-layer;
   removing the roaming-layer from the encapsulated request-layer; and
   communicating the request-layer from the home-agent to a server based on the server-address.

2. The method of claim 1 further comprising:
   generating a response to the request from the home-agent to the server, the response including a response-layer having the server-address and the home-agent-address; and
   communicating the response to the home-agent.

3. The method of claim 2 further comprising:
   encapsulating the response with a roaming-layer, including the real-address and the home-address of the mobile-device; and
   communicating the encapsulated response to the mobile-device.

4. The method of claim 1 including using the program layer below a transmission control protocol/internet protocol (TCP/IP) program layer in the home-agent to modify the encapsulated request-layer with the roaming-layer and communicate the request-layer.

5. A communication system comprising:
   a home-agent;
   a server; and
   a mobile-device including a processor configured to:
      generate a request from the mobile-device, the request comprising a request-layer including a home-address of the mobile-device and a server-address of the server,
      encapsulate the request-layer with a roaming-layer including a real-address of the mobile-device and a home-agent-address,
      communicate the encapsulated request-layer to the home-agent based on the home-agent-address; and
      use respective program layers below transmission control protocol/internet protocol (TCP/IP) program layers in the mobile-device and the home-agent to establish a communication path and maintain a communication path between the home-agent and the mobile-device.

6. The system of claim 5 wherein the home-agent includes a processor configured to remove the roaming-layer from the encapsulated request-layer and communicate the request-layer from the home-agent to the server based on the server-address.

7. The system of claim 5 wherein the home-agent includes a processor configured to:
   encapsulate a response with a roaming-layer, including the real-address and the home-address of the mobile-device and
   communicate the encapsulated response to the mobile-device.

8. A mobile-device comprising:
   a network-interface-adapter;
   a processor configured to:
      generate a request comprising a request-layer including a home-address of the mobile-device and a server-address,
      encapsulate the request-layer with a roaming-layer including a real-address of the mobile-device and a home-agent-address,
      communicate the encapsulated request-layer through the network-interface-adapter to a home-agent based on the home-agent-address; and
      use respective program layers below transmission control protocol/internet protocol (TCP/IP) program layers in the mobile-device and the home-agent to establish a communication and maintain a communication path between the home-agent and the mobile-device.

9. The mobile-device of claim 8, wherein the processor is further configured to:
   receive an encapsulated communication from the home agent, the communication includes a response to a request from the home-agent to the server, the response including a response-layer having the server-address and the home-agent address.

10. The mobile-device of claim 9, wherein the communication is encapsulated with a roaming layer, including the real-address and home-address of the mobile device.

11. A home-agent comprising:
    a network-interface-adapter;
    a processor configured to:
       receive a request-layer encapsulated with a roaming layer, the request-layer including a server address,
       remove the roaming-layer from the encapsulated request-layer, and
       communicate the request-layer through the network-interface-adapter to a server based on the server-address, wherein
       the processor uses respective program layers below transmission control protocol/internet protocol (TCP/IP) program layers.

12. The home-agent of claim 11, the processor configured to:
    receive a response from the server;
    encapsulate the response with a roaming-layer including a real-address and a home-address of a mobile-device, and
    communicate the encapsulated response to the mobile-device.

13. An article comprising a computer-readable medium that stores computer-executable instructions for causing a computer system to:

generate a request from a mobile-device, the request comprising a request-layer including a home-address of the mobile-device and a server-address;

encapsulate the request-layer with a roaming-layer including a real-address of the mobile-device and a home-agent-address;

communicate the encapsulated request-layer to a home-agent based on the home-agent-address; and use respective program layers below transmission control protocol/internet protocol (TCP/IP) program layers in the mobile-device and the home-agent to establish a communication path and maintain a communication path between the home-agent and the mobile-device.

14. The article of claim 13 including instructions for causing the computer system to:

remove the roaming-layer from the encapsulated request-layer; and communicate the request-layer from the home-agent to a server based on the server-address.

15. The article of claim 13 including instructions to:

generate a response to the request from the home-agent to a server, the response including a response-layer containing the server-address and the home-agent-address; and communicate the response to the home-agent.

16. The article of claim 15 including instructions to:

encapsulate the response with a roaming-layer including the real-address and the home-address of the mobile-device; and communicate the encapsulated response to the mobile-device.

17. A computer-readable medium storing computer instructions that when executed on a processor-based device cause the processor based device to:

generate a request from a mobile-device, the request comprising a request-layer including a home-address of the mobile-device and a server-address;

encapsulated the request-layer with a roaming-layer including a real inclding a real-address of the mobile-device and a home-agent -address;

communication the encapsulated request-layer to a home-agent based on the home-agent- address;

use a program layer below a transmission control protocol/internet protocol (TCP/IP) program layer in the mobile-device to generate the request, encapsulate the request-layer and communicate the encapsulated request-layer;

remove the roaming-layer from the encapsulated request-layer; and communicate the request-layer from the home-agent to a server based on the server-address.

18. The computer-readable medium of claim 17 further comprising instructions that cause the processor-based device to:

generate a response to the request from the home-agent to the server, the response including a response-layer having the server-address and the home-agent-address; and communication the response to the home-agent.

19. The computer-readable medium of claim 18 further comprising instructions that cause the processor-based device to:

encapsulate the response with a roaming-layer, including the real-address and the home- address of the mobile-device; and communicate the encapsulated response to the mobile-device.

20. The computer-readable medium of claim 17, wherein the computer instructions that cause the processor-based device to use the program layer below the transmission control protocol/internet protocol (TCP/IP) program layer in the home-agent include computer instructions that cause the processor-based device to modify the encapsulated request-layer with the roaming-layer and communicate the request-layer.

21. A mobile-device comprising:

a network-interface adapter;

a memory storing instructions which, when accessed, result in performing:

generating a request comprising a request-layer including a home-address of the mobile-device and a server-address, encapsulating the request-layer with a roaming-layer including a real-address of the mobile-device and a home-agent-address, communicating the encapsulated request-layer through the network-interface-adapter to a home-agent based on the home-agent-address; and using respective program layers below transmission control protocal/internet protocol (TCP/IP) program layers in the mobile-device and the home-agent to establish a communication path and maintain a communication path between the home-agent and the mobile-device.

22. The mobile-device of claim 21, wherein the memory includes furhter instructions which, when accessed, result in performing:

receiving an encapsulated communication from the home agent, the communication includes a response to a request from the home-agent to a server, the response including a response-layer having the server-address and the home-agent address.

23. The mobile-device of claim 22, wherein the communication is encapsulated with a roaming layer, including the real-address and home-address of the mobile device.

24. A home-agent comprising:

a network-interface-adapter;

a processor configured to:

receive a request-layer encapsulated with a roaming layer, the request-layer including a server address, remove the roaming-layer from the encapsulated request-layer, and communicate the request-layer through the network-interface-adapter to a server based on the server-address, wherein the memory includes respective program layers below transmission control protocol/internet protocol (TCP/IP) program layers.

25. The proxy driver of claim 24, wherein the memory includes further instructions that, when accessed, result in performing:

receiving a response from the server;

encapsulating the response with a roaming-layer including a real-address and a home- address of a mobile-device, and communicating the encapsulated response to the mobile-device.

26. A communication system comprising:

a home-agent;

a server; and a mobile-device including a memory storing instructions that, when accessed, result in performing:
  generating a request from the mobile-device, the request comprising a request-layer including a home-address of the mobile-device and a server-address of the server,
  encapsulating the request-layer with a roaming-layer including a real-address of the mobile-device and a home-agent-address,
  communicating the encapsulated request-layer to the home-agent based on the home-agent-address; and
  using respective program layers below transmission control protocal/internet protocol (TCP/IP) program layers in the mobile-device and the home-agent to establish a communication path and maintain a communication path between the home-agent and the mobile-device.

27. The system of claim 26 wherein the home-agent includes a memory storing instructions that, when accessed, result in performing removing the roaming-layer from the encapsulated request-layer and communicating the request-layer from the home-agent to the server based on the server-address.

28. The system of claim 26 wherein the home-agent includes a memory storing instructions that, when accessed, result in performing:
  encapsulating a response with a roaming-layer, including the real-address and the home-address of the mobile-device, and
  communicating the encapsulated response to the mobile-device.

* * * * *